United States Patent
Sharma

(10) Patent No.: US 7,787,469 B2
(45) Date of Patent: Aug. 31, 2010

(54) SYSTEM AND METHOD FOR PROVISIONING A QUALITY OF SERVICE WITHIN A SWITCH FABRIC

(75) Inventor: Vipul Sharma, Germantown, MD (US)

(73) Assignee: Altera Corporation, San Jose, CA (US)

( * ) Notice: Subject to any disclaimer, the term of this patent is extended or adjusted under 35 U.S.C. 154(b) by 1006 days.

(21) Appl. No.: 10/888,757

(22) Filed: Jul. 12, 2004

(65) Prior Publication Data

US 2006/0007937 A1 Jan. 12, 2006

(51) Int. Cl.
 *H04L 12/28* (2006.01)
 *H04L 12/56* (2006.01)
(52) U.S. Cl. .................. 370/395.21; 370/230; 370/252; 370/468
(58) Field of Classification Search .................. 370/395, 370/230–235, 390, 412, 392, 229, 397, 85.6, 370/395.21, 236.2, 252, 468; 713/502, 153, 713/201; 709/225, 240, 226, 232
See application file for complete search history.

(56) References Cited

U.S. PATENT DOCUMENTS

| | | | |
|---|---|---|---|
| 5,790,522 A | | 8/1998 | Fichou et al. |
| 5,862,126 A | * | 1/1999 | Shah et al. ............. 370/395.21 |
| 6,011,804 A | | 1/2000 | Bertin et al. |
| 6,157,614 A | | 12/2000 | Pasternak et al. |
| 6,215,789 B1 | | 4/2001 | Keenan et al. |
| 6,389,031 B1 | * | 5/2002 | Chao et al. .................. 370/412 |
| 6,480,888 B1 | | 11/2002 | Pedersen |
| 6,563,835 B1 | * | 5/2003 | Chen .......................... 370/410 |
| 6,629,147 B1 | * | 9/2003 | Grow .......................... 709/236 |
| 7,035,279 B2 | * | 4/2006 | Bruckman .................. 370/460 |

(Continued)

FOREIGN PATENT DOCUMENTS

CA EP1185040 A2 * 3/2001

(Continued)

OTHER PUBLICATIONS

Dr. Kamran Sayrafian, *Overview of Switch Fabric Architectures*, The Requirement for Rate-aware Intelligent Global Schedulers, Zagros Networks, Jul. 2002, pp. 1-13, Rockville, MD.

*Primary Examiner*—Ricky Ngo
*Assistant Examiner*—David Oveissi
(74) *Attorney, Agent, or Firm*—Martine Penilla & Gencarella, LLP

(57) ABSTRACT

To address the resources of the switch fabric, one embodiment of the invention provides a system and method for measuring the bandwidth of a switch fabric in addition to measuring the bandwidth in the line cards. The measured bandwidth is compared to the requirements of a routing request received in a controller. If the measured bandwidth of all resources, including the switch fabric, are sufficient to route data traffic in accordance with a predetermined SLA, then the controller reserves bandwidth in the switch fabric as well as in the line cards. Data can then be classified and queued in the line cards, and switched in the switch fabric, in accordance with the bandwidth reservations. Competing data traffic cannot rob the bandwidth in the switch fabric from the data having a bandwidth reservation. Thus, latency is controlled, and a predetermined QoS is met.

19 Claims, 5 Drawing Sheets

U.S. PATENT DOCUMENTS

| | | |
|---|---|---|
| 7,072,295 B1 * | 7/2006 | Benson et al. .............. 370/230 |
| 7,227,841 B2 * | 6/2007 | Mullendore et al. ......... 370/230 |
| 2002/0049841 A1 | 4/2002 | Johnson et al. |
| 2002/0095498 A1 | 7/2002 | Chanda et al. |
| 2002/0107908 A1 | 8/2002 | Dharanikota |
| 2002/0181397 A1 * | 12/2002 | Licht .......................... 370/230 |
| 2003/0018803 A1 | 1/2003 | El Batt et al. |
| 2003/0031126 A1 | 2/2003 | Mayweather et al. |
| 2006/0168337 A1 * | 7/2006 | Stahl et al. .................. 709/240 |

FOREIGN PATENT DOCUMENTS

| | | |
|---|---|---|
| WO | WO 02/11461 A2 | 2/2002 |

* cited by examiner

| | |
|---|---|
| 145 | CONTROLLER CARD |
| 140 | LINE CARD |
| 135 | LINE CARD |
| 130 | SWITCH CARD (Bk) |
| 125 | SWITCH CARD (Pr) |
| 120 | LINE CARD |
| 115 | LINE CARD |
| 110 | LINE CARD |
| 105 | LINE CARD |

SYSTEM AND METHOD FOR PROVISIONING A QUALITY OF SERVICE WITHIN A SWITCH FABRIC

BACKGROUND OF THE INVENTION

The invention relates generally to the field of network communications. More specifically, the invention relates to a system and method for switching communications traffic at a node in a network.

Some techniques for switching communications traffic at a node in a network are known. As illustrated in FIG. 1, a representative switch or router at a node in a network includes a chassis 150 populated by line cards 105, 110, 115, 120, 135, and 140, primary switch fabric card 125, back-up switch fabric card 130, and a controller card 145. Some known routers also use a back-up controller card (not shown).

Data traffic is received in a line card (e.g., 105, 110, 115, 120, 135, 140), and switched through the primary switch fabric card 125. The primary switch fabric card 125 and back-up switch fabric card 130 are configured to redirect network traffic (data) to one or more line cards. In turn, the line cards transmit the network traffic to a next or final destination node on the network. The primary switch fabric card 125 and back-up switch fabric card 130 can include, for example, crossbars or shared memory devices. The line cards 105, 110, 115, 120, 135, and 140 are used for buffering network traffic on either side of the switch fabric, and for performing other functions. Line cards typically serve both ingress and egress functions (i.e., for incoming and outgoing traffic, respectively).

Router communications can be separated into three categories: management plane; control plane; and data plane communications. The management plane is an interface between functions external to the router (e.g., network servers or clients) and the router controller(s). For example, chassis configuration parameters that are derived from Service Level Agreements (SLA's) are communicated to the router on the management plane. The control plane uses local signaling protocols or other messages to control the resources of a router in accordance with the specified configuration. In one respect, the control plane can be used to provision resources in the router in accordance with the SLA's. The data plane carries network data that is being redirected (or forwarded) by the router to the next or final destination node on the network.

Known systems and methods for switching communications traffic have various disadvantageous. For example, in provisioning resources in the control plane, some known systems check for the availability of resources in the line cards, but do not check for the availability of resources in the switch fabric. As a consequence, the potential for congestion in the switch fabric is high, especially during data traffic bursts. Such congestion may lead to undesirable increases in latency. Moreover, inadequate provisioning may result in a loss of data in the router. Either result compromises the ability to provide a Quality of Service (QoS) that is in accordance with the SLA's.

Therefore, a need exists for a system and method to provide more robust bandwidth management in a network switch or router.

SUMMARY OF THE INVENTION

To address the resources of the switch fabric, one embodiment of the invention provides a system and method for measuring the bandwidth of a switch fabric in addition to measuring the bandwidth in the line cards. The measured bandwidth is compared to the requirements of a routing request received in a controller. If the measured bandwidth of all resources, including the switch fabric, are sufficient to route data traffic in accordance with a predetermined SLA, then the controller reserves bandwidth in the switch fabric as well as in the line cards. Data can then be classified and queued in the line cards, and switched in the switch fabric, in accordance with the bandwidth reservations. Competing data traffic cannot rob the bandwidth in the switch fabric from the data having a bandwidth reservation. Thus, latency is controlled, and a predetermined QoS is met.

One embodiment of the invention provides a method for routing a data packet through a node in a network, including: determining a next hop address for the data packet; determining a classification for the data packet; segmenting the data packet into a plurality of cells; and switching each of the plurality of cells through a switch fabric based on the classification and a predetermined reservation of resources in the switch fabric.

One embodiment of the invention provides a system for routing a data packet through a network node, including: a controller configured to determining a next hop address for the data packet; an ingress line card coupled to the controller and having its own processor (e.g., a network processor), the processor of the ingress line card being configured to determine a classification of the data packet, segment the data packet into a plurality of cells, and queue each of the plurality of cells based on the classification and a predetermined reservation of resources in the ingress card; a switch fabric coupled to the ingress line card, the switch fabric configured to receive each of the plurality of cells from the ingress line card; and an egress line card coupled to the switch fabric, the switch fabric configured to switch each of the plurality of cells from the ingress line card to the egress line card based on a predetermined reservation of resources in the switch fabric.

The features and advantages of the invention will become apparent from the following drawings and detailed description.

BRIEF DESCRIPTION OF THE DRAWINGS

Embodiments of the invention are described with reference to the following drawings, wherein:

FIG. 1 is a diagram of a router in a network, according to the related art;

DETAILED DESCRIPTION

The invention is directed to improving the efficiency of a router or similar network element (NE) having the purpose of switching data in a communications network. As used herein, router resources include controller cards, line cards, and switch fabric cards. While embodiments of the invention are described below with reference to the architecture, the control plane, and the data plane, the disclosure of any particular feature of the invention is not necessarily limited to any single sub-heading below.

Architecture

Figure 2:
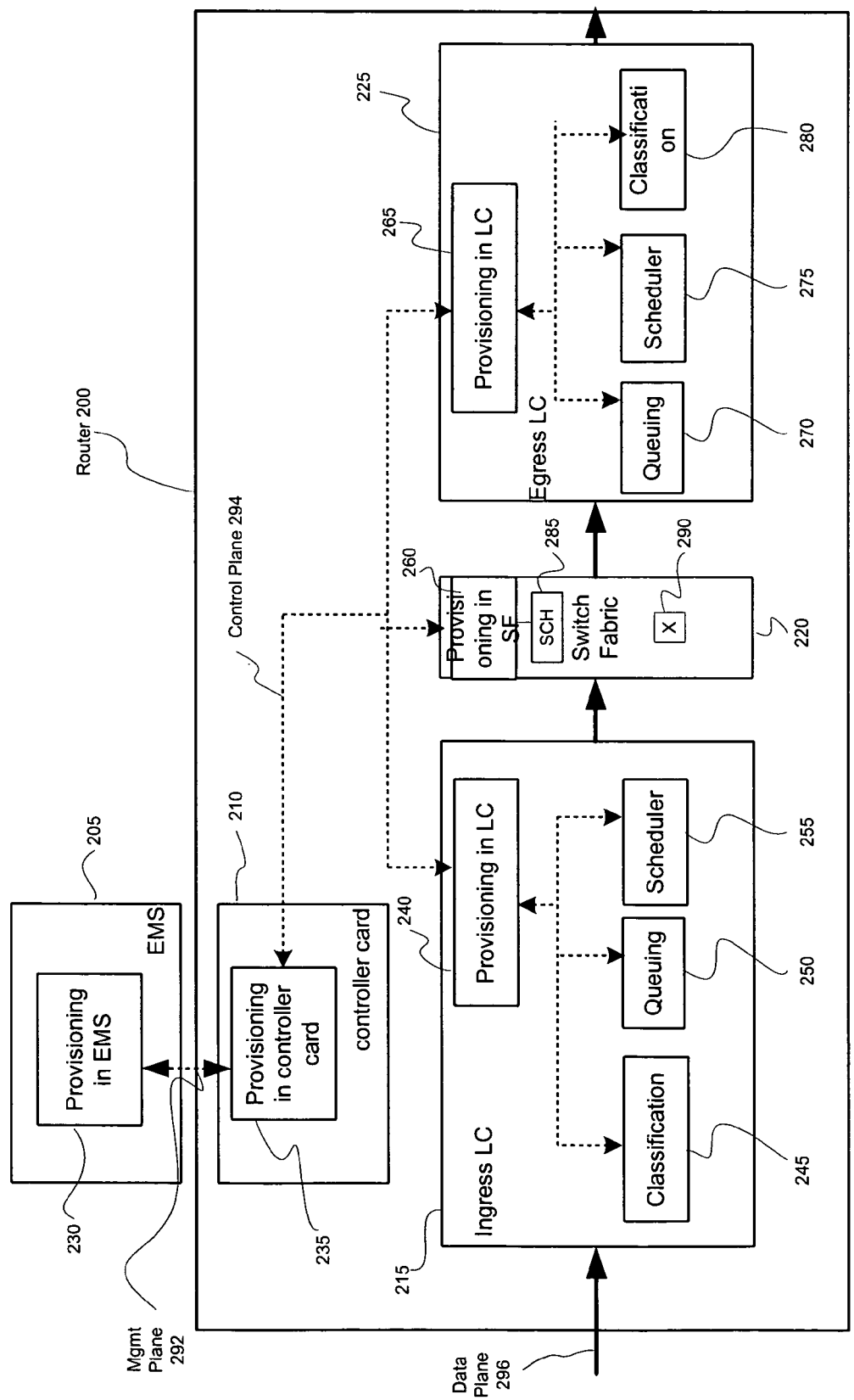
FIG. 2 is a block diagram illustrating a system architecture for provisioning a switch fabric of a router, according to an embodiment of the invention.

FIG. 2 is a block diagram illustrating a system architecture for provisioning a switch fabric of a router, according to an embodiment of the invention. In the illustrated embodiment, a router 200 includes controller card 210 coupled to an ingress line card 215, a switch fabric 220, and an egress line card 225 via a control plane 294. In one embodiment, the ingress line card 215 and the egress line card 220 coexist on the same physical line card. An External Management System (EMS) 205 is coupled to the controller card 210 via a management plane 292.

FIG. 2 also illustrates Provisioning Components (PC's) in each of the foregoing sub-systems that are used to manage a QoS in the router. As shown, the EMS 205 includes PC 230, the controller card 210 includes PC 235, the ingress line card 215 includes PC 240, the switch fabric 220 includes PC 260, and the egress line card 225 includes PC 265. PC's 240, 260, and 265 are in communication with PC 235 over the control plane 294. PC 230 is in communication with PC 235 over the management plane 292.

In the illustrated embodiment, ingress line card 215 includes classification component 245, queuing component 250 and scheduler component 255, all of which are in communication with PC 240. Likewise, egress line card 225 includes classification component 280, queuing component 270 and scheduler component 275, all of which are in communication with PC 265. Switch fabric card 220 includes a scheduler component 285 (in communication with PC 260) and crossbar switches 290.

Alternative embodiments to the architecture shown in FIG. 2 are also possible. For example, a typical router may have a back-up controller card and/or a back-up switch fabric card. Moreover, although a single line card may perform both ingress and egress functions, typical embodiments will include multiple line cards. In some embodiments, the line card(s) include additional switch fabric interface components (not shown) providing additional queuing or other functions to more efficiently couple the line cards to the switch fabric. In certain application environments, either the ingress line card 215 or the egress line card 225 may not require provisioning to effectively guarantee a QoS in the router.

The functional components illustrated in FIG. 2 can be implemented with various hardware approaches. In one hardware embodiment, the classification 225, queuing 250, and scheduler 255 functions of the ingress line card 215 are implemented via a Network Processing Unit (NPU), Traffic Manager (TM), and Fabric Interface Device (FID), respectively. Likewise, the queuing 270, scheduler 275, and classification 280 functions of the egress line card 225 can be implemented with a FID, TM, and NPU, respectively.

In operation, PC 235 of the controller card 210 receives QoS requirements from the EMS or other source over the management plane 292. PC 235 then provisions the router 200 resources by communicating with PC's 240, 260, and 265, of the ingress line card 215, switch fabric card 220, and egress line card 225, respectively, over the control plane 294. Once the router 200 resources are provisioned, data traffic flows into the ingress line card 215, through the switch fabric card 220, and out of egress line card 225 in the data plane 296. Router 200 provisioning via the control plane 294 will be discussed in more detail below with reference to FIGS. 3A and 3B below; data flow will be discussed in greater detail below with reference to FIG. 4.

Control Plane

Figure 3A:
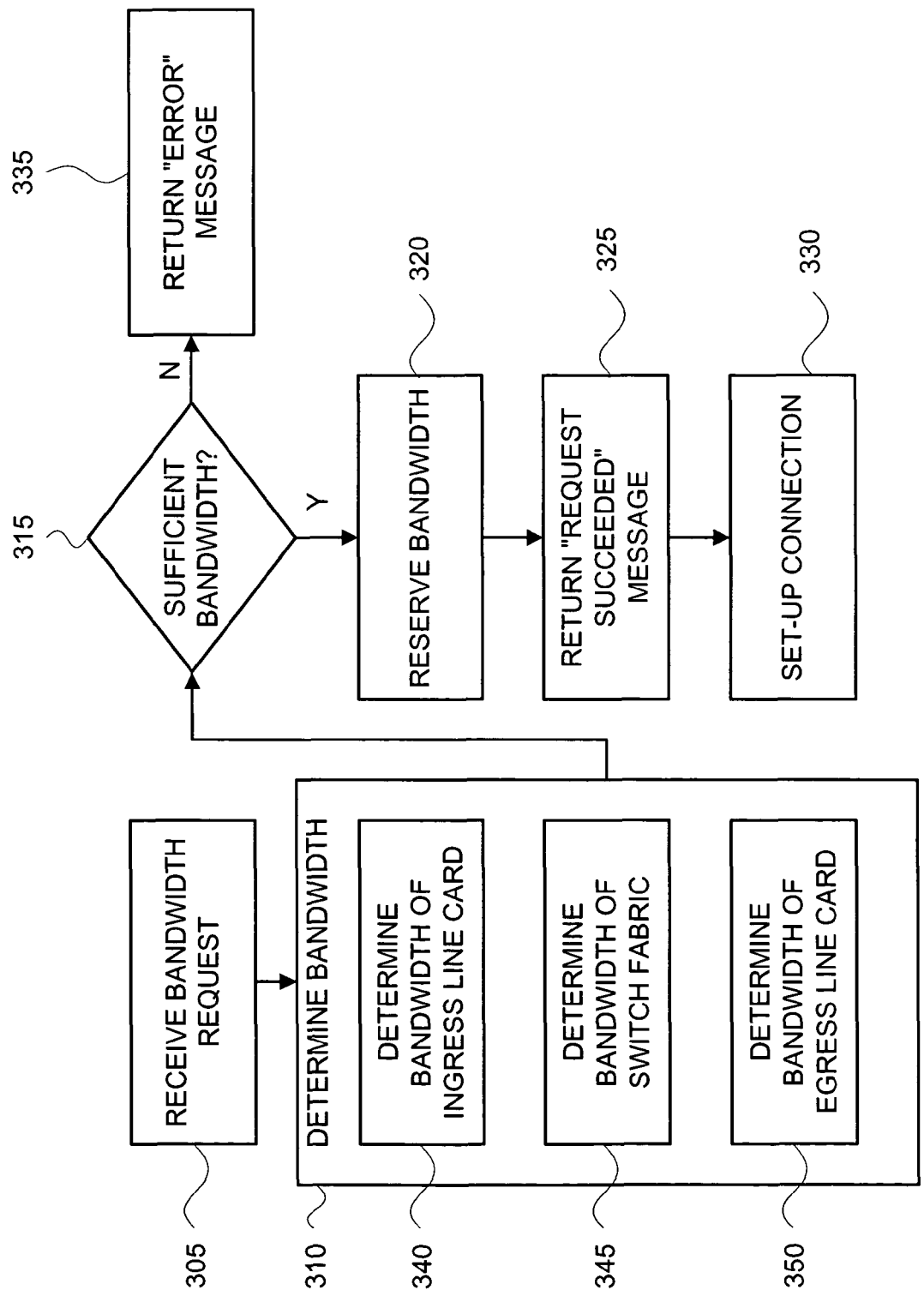
FIG. 3A is a flow diagram illustrating a method for measuring and reserving bandwidth in a switch fabric of a router, according to an embodiment of the invention.

FIG. 3A is a flow diagram illustrating a method for measuring and reserving bandwidth in the switch fabric of a router, according to an embodiment of the invention. As shown therein, the process begins when controller 210 receives a bandwidth request in step 305, for instance from EMS 205.

Figure 3B:
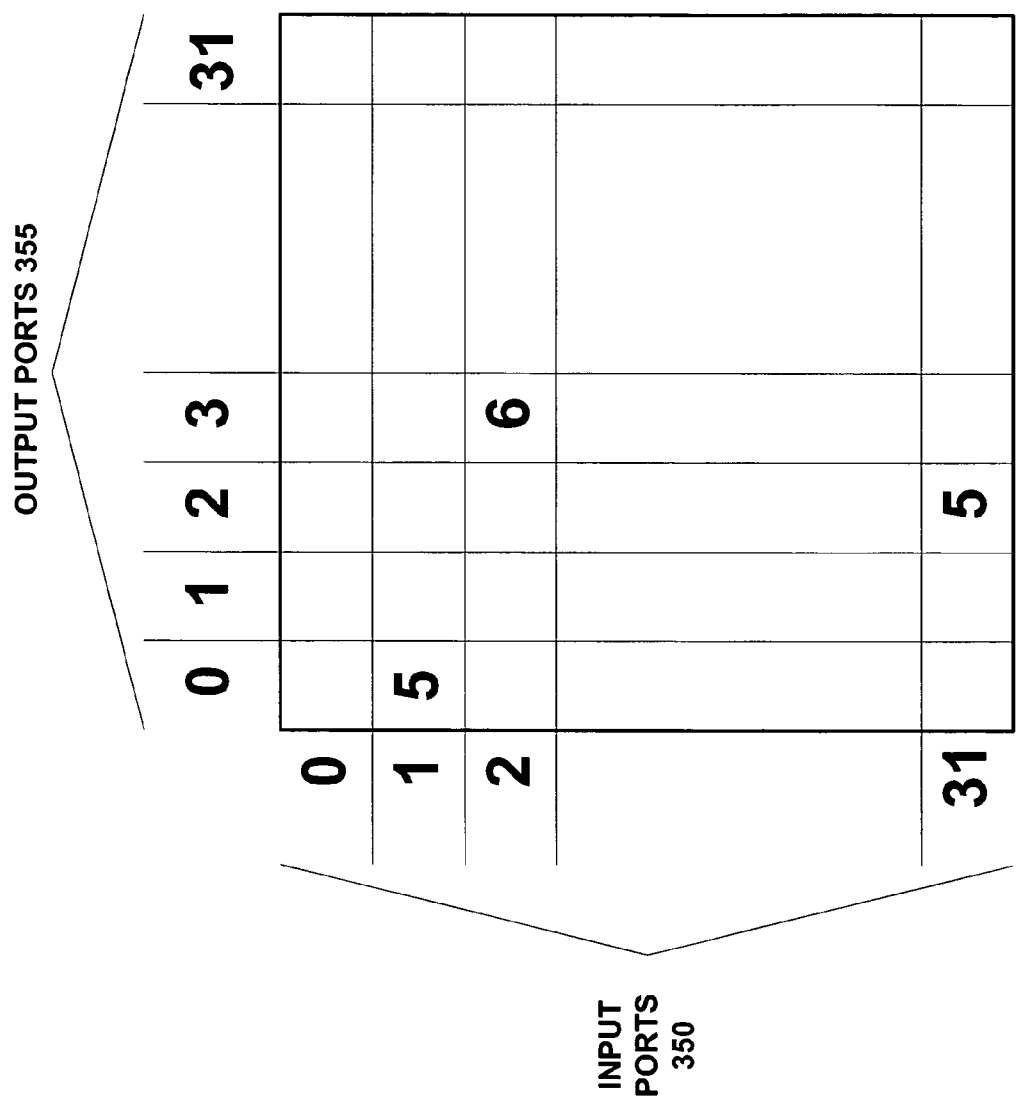
FIG. 3B is an illustration of a bandwidth request table, according to an embodiment of the invention.

The bandwidth request of step 305 may be expressed in terms of a bandwidth request table. FIG. 3B is an illustration of a bandwidth request table, according to an embodiment of the invention where the switch fabric 220 has thirty-two input ports 350 and thirty-two output ports 355. The bandwidth request in step 305 may further include a start time and duration and/or total data size. As an example, controller card 210 may receive a bandwidth request for 6 GB/sec for 9.0 seconds beginning at 4:01 p.m. for the transfer of Class IV data traffic coming in on Port 2 of router 200 via ingress line card 215 and exiting on Port 3 of router 200 via egress line card 225. Such a request seeks a rate guarantee of 6 GB/sec for 9 seconds for the transfer of 54 GB of data at the predetermined time.

In embodiments of the invention, a bandwidth request table like the one illustrated in FIG. 3B could be received for every 15 minutes or other predetermined time interval.

The bandwidth request of step 305 can also be initiated by a command line interface (CLI) or network-based signaling protocol (e.g., Resource Reservation Set-up Protocol (RSVP), or other Multiprotocol Label Switching (MPLS) scheme).

In step 310, the controller card 210 determines available bandwidth in the resources of the router. In the illustrated embodiment, determining the available bandwidth, step 310, includes determining the bandwidth of an ingress line card in step 340, determining the bandwidth of a switch fabric card in step 345 and determining the bandwidth of an egress line card in step 350. As indicated, steps 340, 345, and 350 may be performed in any sequence, in parallel, or in any series/parallel combination, according to design choice. In alternative embodiments, step 310 may not include step 340 and/or step 350.

In execution of steps 340 and 350, PC 235 of controller 210 makes an inquiry regarding resource availability of PC 240 and PC 265, respectively. In turn, PC 240 and PC 265 checks a classification table regarding availability of space to receive an additional classification rule by communicating with classification components 245 and 280, respectively. In addition, PC 240 and PC 265 check for the availability of queues to satisfy the specific request via communication with queuing components 250 and 270, respectively. In embodiments of the invention, queues are reassignable between classes, as required.

In step 345, the controller 210 advantageously checks for available bandwidth in switch fabric card 220 by sending an inquiry from PC 235 to PC 260. Step 345 may include a statistical calculation, enabled by counting units of data flowing through each of the crossbar switches 290 of switch fabric card 220 over a predetermined time. Step 345 is preferably enabled by bit counters (not shown) that are built into the crossbar switches 290 of switch fabric 220.

Alternatively, or in combination, step 345 may include adding a bandwidth reservation request value to an existing bandwidth reservation value to determine whether the sum equals or exceeds a predetermined bandwidth limitation value. For example, for a given input port/output port pair, at a particular time, a bandwidth reservation of 6 GB/sec may already exist, and the predetermined bandwidth limitation value may be 10 GB/sec (e.g., based on hardware constraints). Accordingly, a bandwidth reservation request for an additional 7 GB/sec will be rejected for the same input port/output port pair at the particular time (since (7+6)>10).

In embodiments of step 345, the measurement may be converted to a particular bandwidth unit of measure, for example MBits/sec, according to design choice. In an embodiment of step 345, the switch fabric bandwidth measurements may simply be, for example, a snap-shot of the bandwidth available between each input and output of each crossbar switch. In the alternative, the switch fabric measurements in step 345 may be averages of measured bandwidth over a predetermined time interval.

In conditional step 315, the controller card 210 determines whether the available bandwidth in each of the ingress line card 215, egress line card 225 and switch fabric card 220 is sufficient to satisfy the request received in step 305. If not, then the controller 210 returns an error message to the EMS 205 in step 335 (alternatively, the controller 210 returns an error message via CLI or network-based signaling protocol in step 335, so that the error message is responsive to the original bandwidth request received in step 305).

If the controller 210 determines in step 315 that router resources are sufficient to handle the request, then the EMS 205 provides configuration information to controller 210 for the reservation of resources in the ingress line card 215, egress line card 225 and switch fabric card 220. For example, with a view of available bandwidth in the router resources, the EMS 205 may allocate the total bandwidth requirement on a per line card or per port basis, and may also assign numbers of classifier entries and queuing blocks to be reserved in each of the ingress line card 215 and egress line card 225. Also in step 315, the PC's 240, 260, and 265 configure scheduler components 255, 285, and 275, respectively, in accordance with the reservation.

The bandwidth reservation may be expressed in a reservation table that is analogous to the bandwidth request table illustrated in FIG. 3B. Moreover, a reservation table may exist for each predetermined time interval within a predetermined reservation window.

Once the reservation of bandwidth in the resources of the router is complete, the controller 210 sends a "request succeeded" message to the EMS 205 in step 325 (alternatively, the controller 210 returns a "request succeeded" message via CLI or network-based signaling protocol in step 335, so that the "request succeeded" message is responsive to the original bandwidth request received in step 305) and sets up the connection in the data plane 296 (at the appropriate time) in step 330.

In an alternative embodiment to the process illustrated in FIG. 3A, the order of steps 305 and 310 are reversed. The advantage of such an embodiment is that there is less delay between receiving a bandwidth request in step 305 and determining whether the available bandwidth is sufficient in conditional step 315. The disadvantage of executing step 310 prior to step 305 is that the available bandwidth (measured in step 310) used in executing conditional step 315 is less current (and potentially less accurate) than in the illustrated embodiment.

Accordingly, in response to a routing request at a desired level of service, the controller card 210 first measures the available bandwidth in each of the router resources. Then, if appropriate, the controller card 210 reserves sufficient bandwidth in those same resources to provide a rate guarantee.

Data Plane

Figure 4:
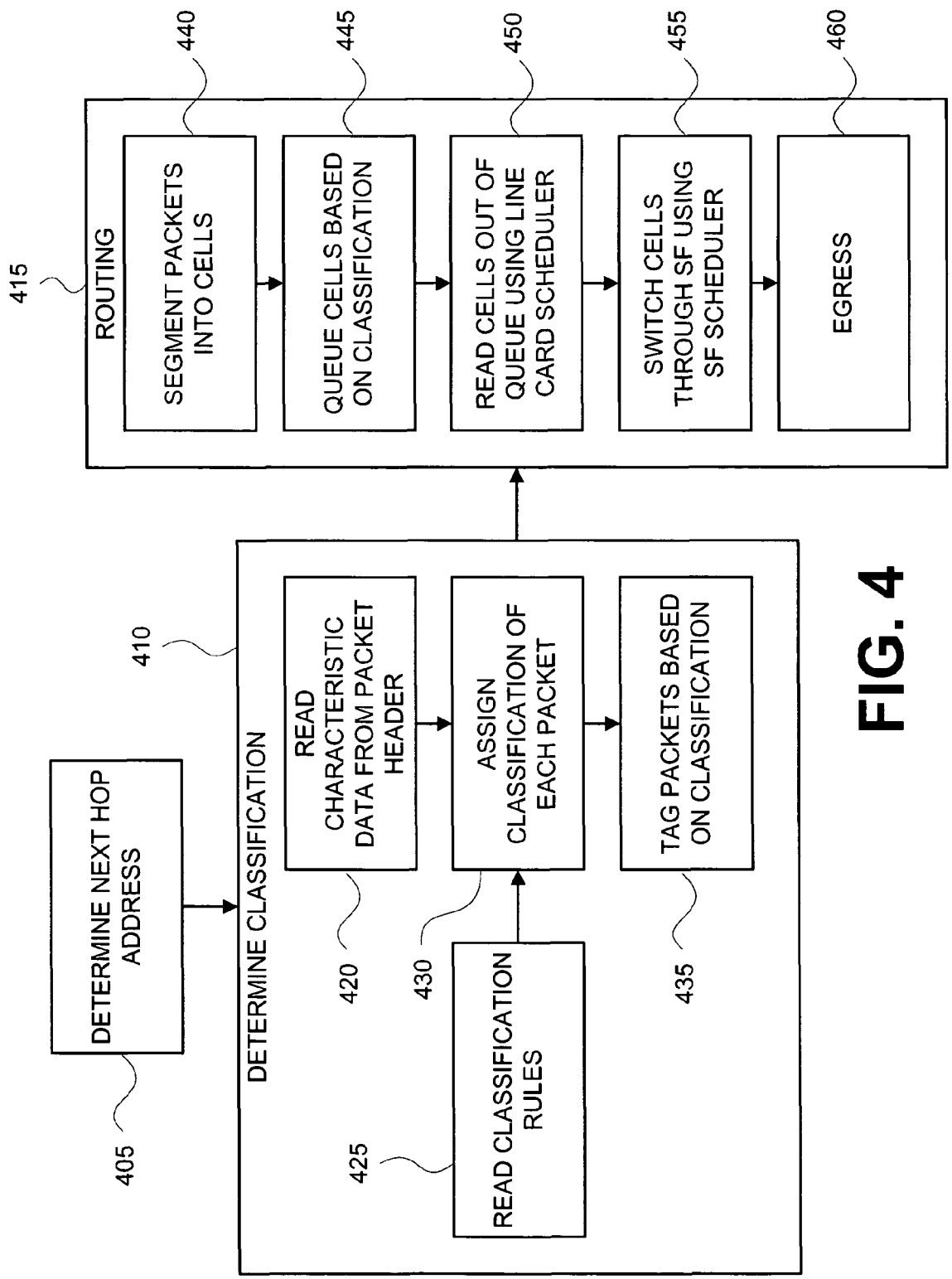
FIG. 4 is a flow diagram illustrating a method for switching data through a switch fabric in accordance with a bandwidth reservation, according to an embodiment of the invention.

FIG. 4 is a flow diagram illustrating a method for switching data through a switch fabric in accordance with a bandwidth reservation, according to an embodiment of the invention. In step 405, a next hop address is determined by the EMS 205 or other management source external to the router 200. The data is then routed in step 415.

In the illustrated embodiment, step 410 begins by reading characteristic data from a packet header in step 420. In step 430, the characteristic data of each packet is associated with a SLA classification with knowledge of, or by reading classification rules, in step 425. For example, the characteristic data extracted in step 420 might indicate that the data originates from GeeWiz ISP, and the classification rules in step 425 might indicate that all data originating from GeeWiz is to be assigned a classification of 4 (representing the highest service level). Thus, classification component 245 assigns a classification to the incoming data in step 430 in accordance with the characteristic data and the classification rules. In step 435, the incoming data packets are tagged according to the classification assigned in step 430.

In the alternative, or in combination, classification rules could be based on the incoming port. Other classification schemes are also possible.

In the illustrated embodiment, routing step 415 includes segmentation step 440, queuing step 445, reading step 450, switching step 455, and egress step 460.

In step 440, incoming packets are segmented into fixed-sized cells, and each of the fixed-sized cells are tagged based on the classification of the incoming packets. Next, in step 445, cells are queued in queuing component 250 according to the classification tag applied in step 440. For example, cells tagged with a "1" are stored in the class 1 queue, cells tagged with a "2" are stored in the class 2 queue, and so on. In step 450, cells are read out of the queuing component 250 and presented to the input of the switch fabric card 220 according to the reservation in the scheduler component 255. In step 455, cells are switched through the switch fabric card 220 according to the reservation in the switch fabric card scheduler 285. Egress step 460 substantially mirrors the above steps illustrated in FIG. 4: cells are queued, aggregated into packets, and classified according to the scheduler component 275 of the egress card 225, and appropriate header information is appended to each packet for classification at the next or final network destination according to the classification component 280.

Data is thus promoted through a router in accordance with a predetermined reservation in the ingress card, the switch fabric card, and the egress card.

CONCLUSION

The invention described above thus overcomes the disadvantages of known systems by providing dynamic link sizing for on-the-fly reallocation of bandwidth. Moreover, the reservation scheme advantageously provides interflow isolation, since competing data traffic cannot rob bandwidth where it has been reserved. The result is that latency is controlled, and a router is able to provide a reliable amount of bandwidth, even under burst or other instances of congestion in the router to deliver an acceptable QoS.

While this invention has been described in various explanatory embodiments, other embodiments and variations can be effected by a person of ordinary skill in the art without departing from the scope of the invention.

What is claimed is:

1. A method for routing packets through a router in a network, comprising:

receiving a bandwidth allocation request for routing a plurality of packets in the router, the bandwidth allocation request including a start time, a total data size, and a period of time for which to reserve the bandwidth, the router including a switch fabric configured to switch packets from one or more ingress line cards to one or more egress line cards;

measuring available bandwidth in the switch fabric in the router;

reserving bandwidth in the switch fabric for the period of time when the available bandwidth in the switch fabric is sufficient to support the requested bandwidth for the period of time; and setting up a data connection when the bandwidth has been reserved and sending an error message otherwise to indicate that the bandwidth has not been reserved.

2. The method of claim 1, further comprising, measuring available bandwidth in an ingress line card associated with the resource allocation, and measuring available bandwidth in an egress line card associated with the resource allocation.

3. The method of claim 2, wherein setting up a data connection further includes, reserving bandwidth in the ingress line card and in the egress line card to switch traffic between the ingress line card and the egress line card for the reserved bandwidth and for the period of time.

4. The method of claim 3, wherein routing a plurality of packets further includes, transferring the plurality of packets through the router based on the reserved bandwidth in the switch fabric, in the ingress line card, and in the egress line card.

5. The method of claim 1, further comprising sending a "request succeeded" message when setting up the data connection.

6. A method for routing a data packet through a router in a network, comprising:

receiving the data packet at an ingress line card;

measuring available bandwidth in a switch fabric in the router;

reserving bandwidth, in the switch fabric in the router for routing the data packet based on the available bandwidth and a bandwidth request that includes a start time, a total data size, and a duration, the switch fabric configured to switch packets from one or more ingress line cards to one or more egress line cards;

determining a next hop address for the data packet;

determining a classification for the data packet;

segmenting the data packet into a plurality of cells at the ingress line card;

switching each of the plurality of cells through the switch fabric based on the classification for the data packet and using the reserved bandwidth in the switch fabric;

queuing each of the plurality of cells in an egress line card after the switching; and aggregating at the egress line card the plurality of cells into the data packet before sending the packet out of the router.

7. The method of claim 6, wherein determining the classification is based on a predetermined classification tag in a header of the data packet.

8. The method of claim 6, wherein determining the classification is based on characteristic data from a header of the data packet.

9. The method of claim 8, wherein determining the classification includes assigning a classification to the data packet based on the characteristic data and a predetermined classification rule.

10. The method of claim 9, wherein determining the classification includes tagging the data packet based on the determined classification.

11. The method of claim 6, further comprising queuing each of the plurality of cells in the ingress line card based on the classification and a predetermined reservation of bandwidth in the ingress line card.

12. The method of claim 11, further comprising reading each of the plurality of cells out of the ingress line card based on the classification.

13. The method of claim 6, wherein queuing each of the plurality of cells in the egress line card is based on the classification and a predetermined reservation of bandwidth in the egress line card.

14. The method of claim 13, further comprising reading each of the plurality of cells out of the ingress line card based on the classification.

15. A system for routing at least one packet through a node in a network, comprising:

means for receiving the data packet at an ingress line card;

means for measuring available bandwidth in a switch fabric in the router;

means for reserving bandwidth, in the switch fabric in the node for routing the data packet based on the available bandwidth and a bandwidth request that includes a start time, a total data size, and a duration, the switch fabric configured to switch packets from one or more ingress line cards to one or more egress line cards;

means for determining a next hop address for the data packet;

means for determining a classification for the data packet;

means for segmenting the data packet into a plurality of cells at the ingress line card;

means for switching each of the plurality of cells through the switch fabric based on the classification for the data packet and using the reserved bandwidth in the switch fabric;

means for queuing in an egress line card each of the plurality of cells after the switching; and means for aggregating at the egress line card the plurality of cells into the data packet before sending the packet out of the node.

16. A system for routing a data packet through a network node, comprising:

a controller configured to determining a next hop address for the data packet;

an ingress line card coupled to the controller and having its own processor, the processor of the ingress line card being configured to determine a classification of the data packet, segment the data packet into a plurality of cells, and queue each of the plurality of cells based on the classification and a predetermined reservation of bandwidth in the ingress line card;

a switch fabric coupled to the ingress line card, the switch fabric configured to receive each of the plurality of cells from the ingress line card; and an egress line card coupled to the switch fabric, the switch fabric configured to switch each of the plurality of cells from the ingress line card to the egress line card based on a predetermined reservation of bandwidth in the switch fabric for a start time, a total data size, and a predetermined period of time, the bandwidth being reserved in the switch fabric for the period of time after measuring available bandwidth in the switch fabric and when there is enough available bandwidth in the switch fabric, the predetermined reservation being performed before the data packet is sent, the egress line card configured to aggregate the plurality of cells into the data packet before sending the packet out of the node.

17. A method for routing packets through a router in a network, comprising:
    receiving a bandwidth allocation request in the router for a data traffic flow, the bandwidth allocation request including a bandwidth reservation with a start time, a duration, and a total amount of data to be transferred using the bandwidth reservation, wherein the bandwidth allocation is terminated after the total amount of data has been transferred, the router including a switch fabric configured to switch packets from one or more ingress line cards to one or more egress line cards;
    measuring available bandwidth in the switch fabric in the router;
    reserving bandwidth in the switch fabric for the bandwidth allocation request when the measuring indicates that bandwidth is available in the switch fabric to support the bandwidth reservation and the total amount of data; and
    replying to the bandwidth allocation request with a request succeeded message when bandwidth has been reserved and replying with an error message otherwise.

18. The method of claim 17, further including,
    routing data traffic thorough the switch fabric using the reserved bandwidth to provide the bandwidth reservation for the data traffic.

19. The method of claim 17, further including,
    setting a connection thorough the switch fabric with the reserved bandwidth, the connection through the switch fabric including an ingress line card and an egress line card, and
    reserving bandwidth in the ingress and egress line cards.

* * * * *